(12) United States Patent
Chiu et al.

(10) Patent No.: US 12,124,548 B2
(45) Date of Patent: Oct. 22, 2024

(54) AUTHENTICATION SYSTEM USING NEURAL NETWORK ARCHITECTURE

(71) Applicant: MEDIATEK INC., Hsinchu (TW)

(72) Inventors: Hung-Chih Chiu, Hsinchu (TW); En Jen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 353 days.

(21) Appl. No.: 17/675,266

(22) Filed: Feb. 18, 2022

(65) Prior Publication Data

US 2023/0267186 A1    Aug. 24, 2023

(51) Int. Cl.
*G06F 21/32* (2013.01)
*G06N 3/045* (2023.01)

(52) U.S. Cl.
CPC .............. *G06F 21/32* (2013.01); *G06N 3/045* (2023.01)

(58) Field of Classification Search
CPC ...... G06F 21/32; G06N 3/045; G06N 3/0464; G06N 3/082; G06N 3/09
See application file for complete search history.

(56) References Cited

U.S. PATENT DOCUMENTS

| 11,627,888 | B2 * | 4/2023 | Melker | A61B 5/0261 |
| | | | | 600/479 |
| 2020/0218884 | A1 * | 7/2020 | Wu | G06F 18/213 |
| 2020/0349247 | A1 * | 11/2020 | Seo | A61B 5/36 |
| 2021/0303668 | A1 * | 9/2021 | Bannerjee | A61B 5/117 |
| 2023/0051939 | A1 * | 2/2023 | Chiu | A61B 5/02433 |

FOREIGN PATENT DOCUMENTS

| CN | 110458197 A | 11/2019 |
| CN | 111831989 A | 10/2020 |
| TW | 202026945 A | 7/2020 |

OTHER PUBLICATIONS

Chinese language office action dated Dec. 6, 2022, issued in application No. TW 111111787.

* cited by examiner

*Primary Examiner* — Abiy Getachew
(74) *Attorney, Agent, or Firm* — McClure, Qualey & Rodack, LLP

(57) ABSTRACT

An authentication system for authenticating an identification of a subject is provided. The authentication system includes a photoplethysmogram (PPG) sensor, a storage device, and a processor. The PPG sensor is configured to sense pulses of a blood vessel of the subject to generate a sensed PPG signal of the subject. The storage device stores an authentication model. The processor is configured to load the authentication model from the storage device and input the sensed PPG signal and a reference PPG signal into the authentication model to generate a result value which indicates whether the identification of the subject passes an authentication test.

21 Claims, 8 Drawing Sheets

AUTHENTICATION SYSTEM USING NEURAL NETWORK ARCHITECTURE

BACKGROUND OF THE INVENTION

Field of the Invention

The invention relates to an authentication system, and more particularly to an authentication system based photoplethysmogram (PPG) signal using a neural network architecture.

Description of the Related Art

In recent years, biometric authentication has been used in computer science as a form of identification and access control. Generally, biometric authentication is achieved by recognizing a physiological characteristic, such as fingerprint, a face, a palm print, hand geometry, an iris, a retina, and so on. Some physiological characteristics, however, can be easily forged. During the measurement or detection of the physiological characteristics, environmental obstacles may affect the accuracy of the recognition.

BRIEF SUMMARY OF THE INVENTION

Thus, it is desired to provide an authentication system which can authenticate an identification of a subject by recognizing unique personal characteristics without being fooled by forgeries.

An exemplary embodiment of an authentication system for authenticating an identification of a subject is provided. The authentication system comprises a photoplethysmogram (PPG) sensor, a storage device, and a processor. The PPG sensor is configured to sense pulses of a blood vessel of the subject to generate a sensed PPG signal of the subject. The storage device stores an authentication model. The processor is configured to load the authentication model from the storage device and input the sensed PPG signal and a reference PPG signal into the authentication model to generate a result value which indicates whether the identification of the subject passes an authentication test.

An exemplary embodiment of an authentication method for authenticating an identification of a subject. The authentication method comprises the steps of sensing pulses of a blood vessel of the subject to generate a sensed PPG signal of the subject; determining whether the sensed PPG signal and a reference PPG signal are in the same category by using an authentication model to generate a result value; and determining whether the identification of the subject passes an authentication test according to the result value.

According to an embodiment, the authentication model is implemented by a neural network architecture.

According to an embodiment, the neural network architecture is a double convolutional neural network (CNN) comprising two sub-networks which respectively receive the sensed PPG signal and the reference PPG signal and share weights.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
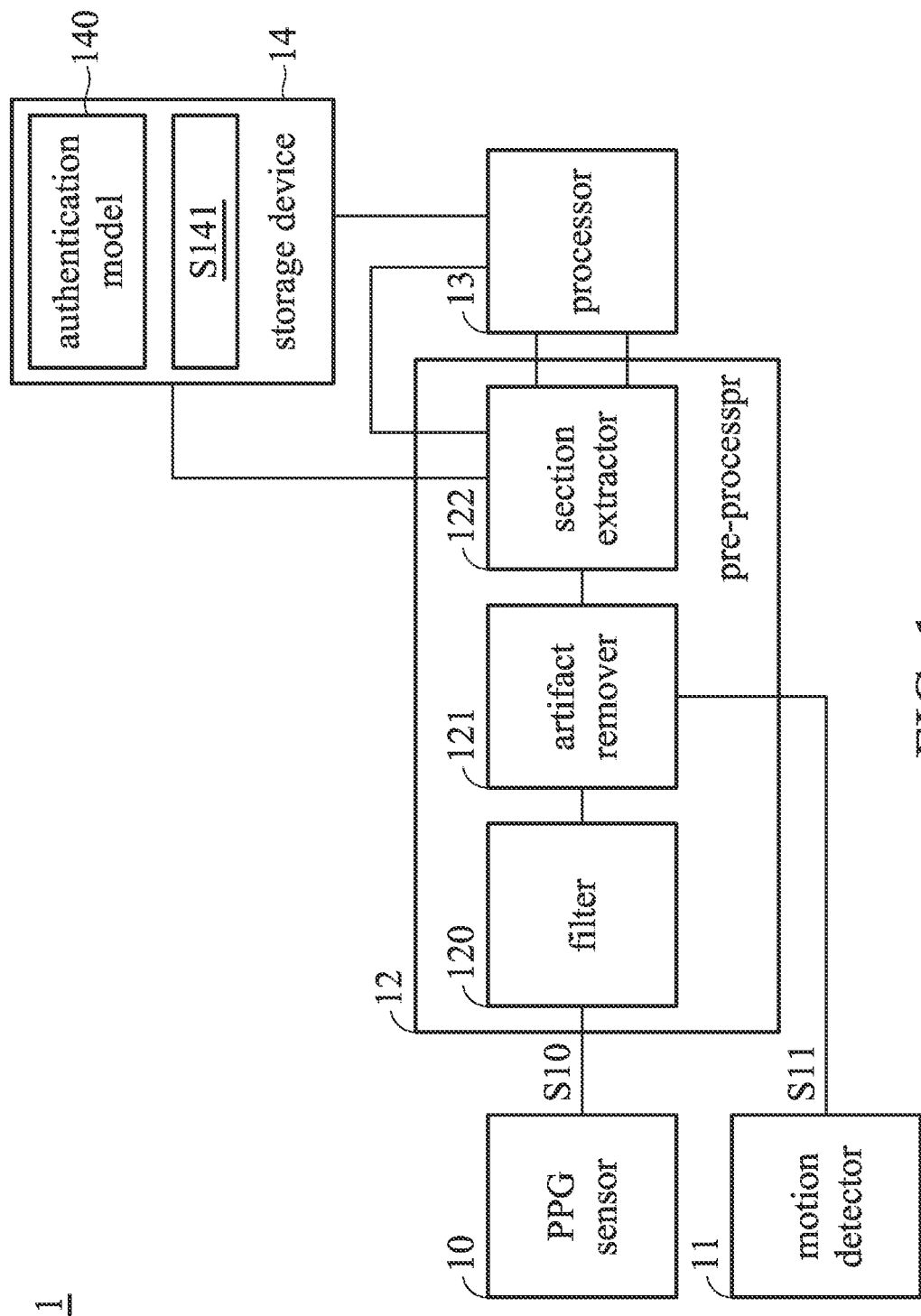
FIG. 1 shows an exemplary embodiment of an authentication system for authenticating an identification of a subject.

FIG. 1 shows an exemplary embodiment of an authentication system for authenticating an identification of a subject. Referring to FIG. 1, an authentication system 1 comprises a photoplethysmogram (PPG) sensor 10, a motion detector 11, a pre-processor 12, a processor 13, and a storage device 14.

The PPG sensor 10 comprises at least one light source. When the PPG sensor 10 is activated, the PPG sensor 10 illuminates the skin of the subject by light beams emitted from the light source. The light beams, which are emitted from the light source, travel through the tissue and blood under the skin and then are received by and collected in the PPG sensor 10. The PPG sensor 10 detects the changes in light absorption of the blood under the skin according to the collected light beams for sensing pulses of the blood vessel of the subject. The PPG sensor 10 generates a sensed PPG signal S10 in a time domain according to the amount of received light beams. In an embodiment, the PPG sensor 10 communicates with the pre-processor 12 by a wire or wireless manner to transmit the sensed PPG signal S10 to the pre-processor 12.

The motion detector 11 operates to detect the movement of the subject and generates a movement signal S11 according to the detection result. In an embodiment, the motion sensor 11 is implemented by an accelerometer, and the movement signal S11 contains at least two direction components. For example, the movement signal S11 contains an X-axis component, a Y-axis component, and a Z-axis component. In an embodiment, the motion detector 11 communicates with the pre-processor 12 by a wire or wireless manner to transmit the movement signal S11 to the pre-processor 12.

In an embodiment, the pre-processor 12 may be composed of at least one integrated circuit, such as a micro controller, a microprocessor, a digital signal processor (DSP), and a Field Programmable Gate Array (FPGA), Application Specific Integrated Circuit (ASIC) or a logic circuit to implement. The pre-processor 12 operates to process the sensed PPG signal S10 for obtaining a version of the sensed PPG signal S10 without noise and environmental interference and further to segment the sensed PPG signal S10 into data sections by window size. For example, referring to FIG. 1, the pre-processor 12 comprises a filter 120, an artifact remover 121, and a section extractor 122.

In an embodiment, the filter 120 receives the sensed PPG signal S10 and processes the sensed PPG signal S10 by performing a filter operation to filter out noise and a component in a specific frequency range from the sensed PPG signal S10. The sensed PPG signal S10, which has been processed by the filter 120, is provided to the artifact remover 121.

The artifact remover 121 receives the movement signal S11 from the motion detection 11 and the sensed PPG signal S10 from the filter 120. The artifact remover 121 detects a motion artifact of the subject according to the movement signal S11. In response to the detection, the artifact remover 121 processes the sensed PPG signal S10 by performing a motion-artifact removal operation on the sensed PPG signal S10. For example, when the motion sensor 11 senses that the subject moves violently according to the movement signal S11, the artifact remover 121 removes at least one signal section, which corresponds to the motion artifact of the subject, from the sensed PPG signal S10.

Figure 3:
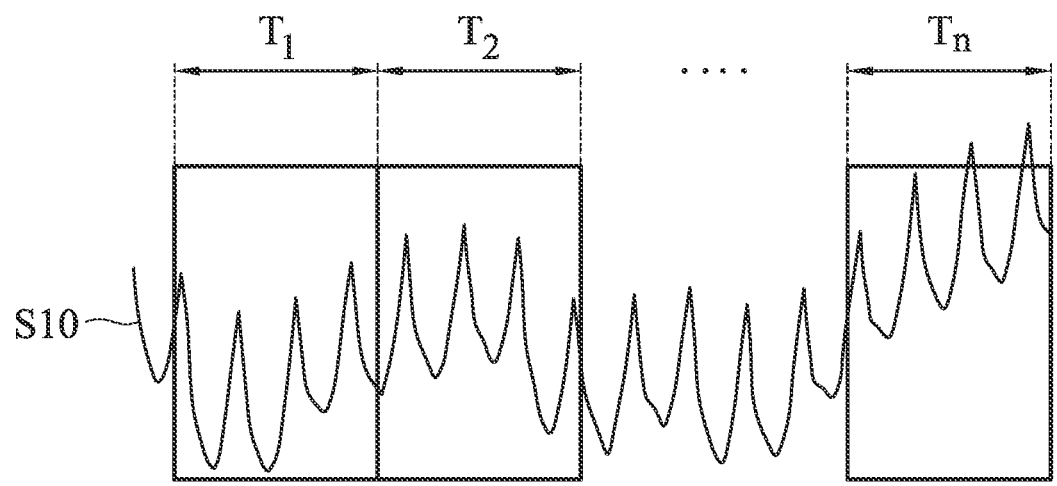
FIG. 3 is a schematic diagram showing data sections which are obtained by segment the sensed PPG signal by window size.

The sensed PPG signal S10, which has been processed by the filter 120 and the artifact remover 121, is provided to the section extractor 122. The section extractor 122 segments the sensed PPG signal S10 into data sections by window size. In an embodiment, the window size is adjustable. Referring to FIG. 3, the sensed PPG signal S10 is segmented into data sections DS10 by several time intervals $T_1 \sim T_n$. The time intervals $T_1 \sim T_n$ have same length of time. Thus, each of the time intervals $T_1 \sim T_n$ serves as a window, and the length of the time intervals $T_1 \sim T_n$ serves as the size of the window, which is referred to as "window size". In an embodiment, the window size is initially set as five seconds.

In one embodiment, the storage device 14 can be implemented by a read-only memory, a flash memory, a floppy disk, a hard disk, a compact disk, a flash drive, a magnetic tape, a network accessible database, or a storage medium having the same function by those skilled in the art. The storage device 14 is used to store an authentication model 140 and further store data sections of a reference PPG signal S141 of the subject. In an embodiment, the authentication model 140 may be implemented by software, and this software can be executed by the processor 13.

In an embodiment, the data sections of the reference PPG signal S141 of the subject are stored in the storage device 14 previously. The reference PPG signal S141 was sensed by the PPG sensor 10 before the sensed PPG signal S10 is obtained. The reference PPG signal S141 was also processed by the filter 120 and the artifact remover 121 of the pre-processor 12 and then segmented by the section extractor 122 into data sections by the same window size. The data sections of the reference PPG signal S141 were provided to the storage device 14 for storage.

In an embodiment, the processor 13 may be composed of at least one integrated circuit such as a micro controller, a microprocessor, a digital signal processor (DSP), and a Field Programmable Gate Array (FPGA), Application Specific Integrated Circuit (ASIC) or a logic circuit to implement. The processor 13 loads the authentication model 140 from the storage device 14 and accesses at least one data section of the reference PPG signal S141 stored in the storage device 14. The processor 13 inputs at least one data section of the sensed PPG signal S10 and at least one data section of the reference PPG signal S141 into the authentication model 140 to generate a result value which indicates whether the identification of the subject passes an authentication test.

In the embodiment, the authentication model 140 is implemented by a neural network architecture which has two inputs for the sensed PPG signal S10 and the reference PPG signal S141. For example, the neural network architecture is implemented by a double convolutional neural network (CNN) comprising two sub-networks, and the two sub-networks share weights.

In an embodiment, the authentication system 1 may be implemented on a mobile phone, a tablet, a smart watch, a server, a notebook computer, or other electronic devices. The authentication model 140 in the authentication system 1 may correspond to a function in an application. For example, the authentication system 1 is implemented by a mobile phone. There is an application in this mobile phone. When this application is triggered, pulses of the blood vessel of the user (subject) of the mobile phone are sensed through the PPG sensor 10. After the sensed PPG signal S10 is obtained, the authentication model 140 performs the authentication test of the identification of the subject on the sensed PPG signal S10.

According to the embodiment of the present application, the authentication system 1 authenticates identification of a subject directly using a raw PPG signal of the subject through the neural network architecture, without feature detection and statistical analysis of the detected features on the PPG signal. Moreover, since the authentication model 140 is implemented by the neural network architecture, the domain knowledge about features of human PPG signals is not required, and the accuracy of the authentication test can be enhanced through the self-supervised learning of the neural network architecture.

Figure 2:
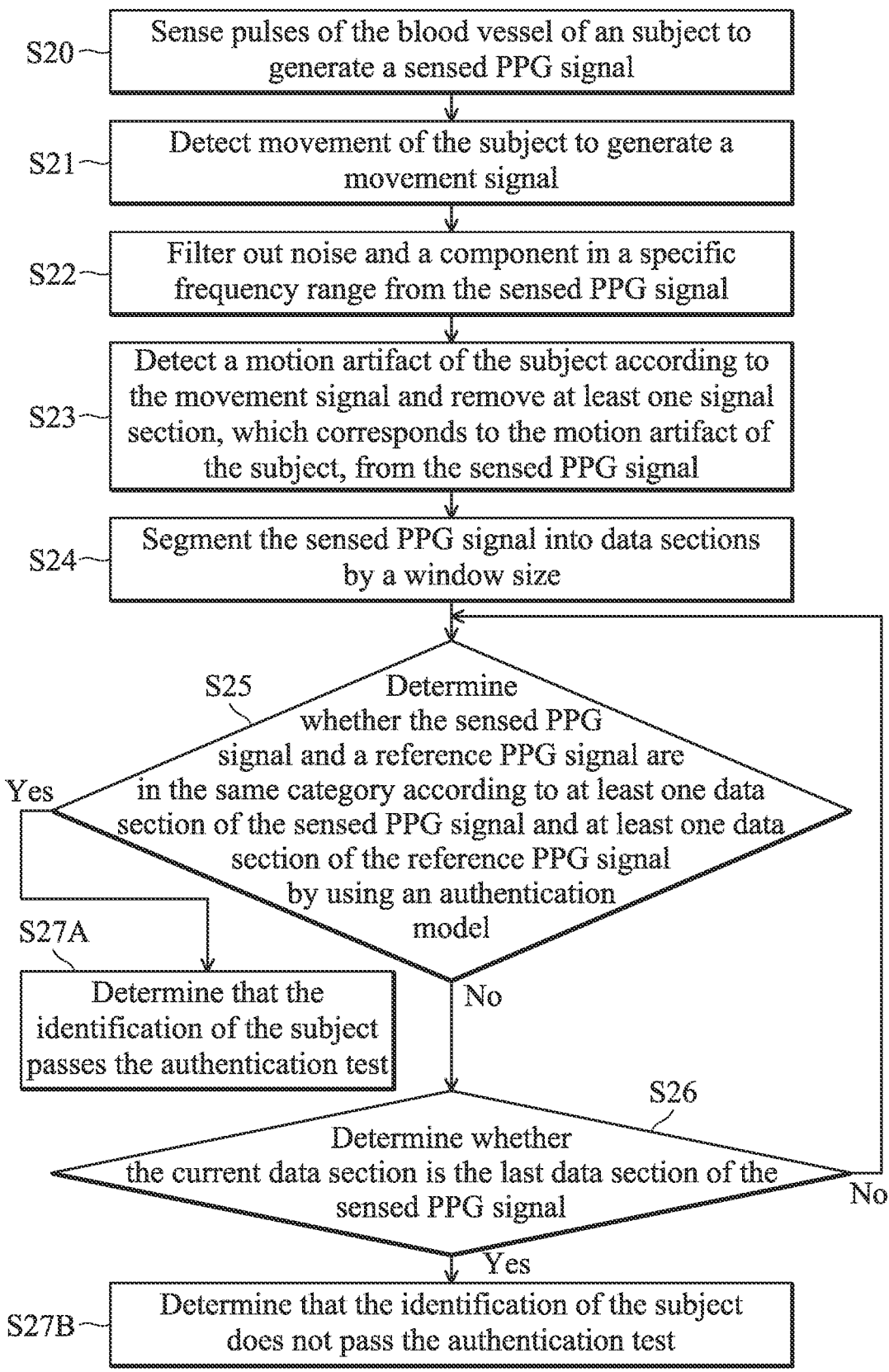
FIG. 2 shows an exemplary embodiment of an authentication method for authenticating an identification of a subject

FIG. 2 shows an exemplary embodiment of an authentication method for authenticating an identification of a subject. In the following the authentication method will be explained by referring to FIG. 1 and FIG. 2.

In Step S20, the PPG sensor 10 senses pulses of the blood vessel of the subject and generates a sensed PPG signal S10 according to the sensing result.

In Step S21, the motion detector 11 detects movement of the subject and generates a movement signal S11 according to the detection.

In the embodiment, the movement of the subject is detected while the pulses of the blood vessel of the subject are sensed. In other words, Step S20 and Step 21 are performed simultaneously, so that the movement of the subject which occurs during the sensing of the pulses of the blood vessel of the subject can be detected.

In Step S22, the filter 120 performs a filter operation to filter out noise and a component in a specific frequency range from the sensed PPG signal S10.

In Step S23, the artifact remover 121 detects a motion artifact of the subject according to the movement signal S11 and performs a motion-artifact removal operation on the sensed PPG signal S10 to remove at least one signal section, which corresponds to the motion artifact of the subject, from the sensed PPG signal S10.

In the embodiment of FIG. 2, Step 22 in which the sensed PPG signal S10 is processed through the filter operation is performed, and then Step 23 in which the sensed PPG signal S10 is processed through the motion-artifact removal operation is performed. However, the order in which Step 22 and Step 23 are performed on the sensed PPG signal S10 is not limited to the above embodiment. For example, in another embodiment, Step 23 in which the sensed PPG signal S10 is processed through the motion-artifact removal operation is performed before Step 22 in which the sensed PPG signal S10 is processed through the filter operation, that is, Step 23 is followed by Step S22.

In Step S24, the section extractor 122 segments the sensed PPG signal S10, which has been processed through the filter operation and the motion-artifact removal operation, into a plurality of data sections by window size as shown in FIG. 3.

In Step S25, the processor 13 determines whether the sensed PPG signal and a reference PPG signal S141 are in the same category according to at least one data section of the sensed PPG signal S10 and at least one data section of the reference PPG signal S141 by using an authentication model 140 to generate a result value. In an embodiment, the processor 13 loads the authentication model 140 from the storage device 14 and accesses at least one data section of the reference PPG signal S141 which is stored in the storage device 14 previously. The processor 13 inputs at least one data section of the sensed PPG signal S10 and at least one data section of the reference signal PPG S141 into the authentication model 140 to generate a result value.

Figure 4:
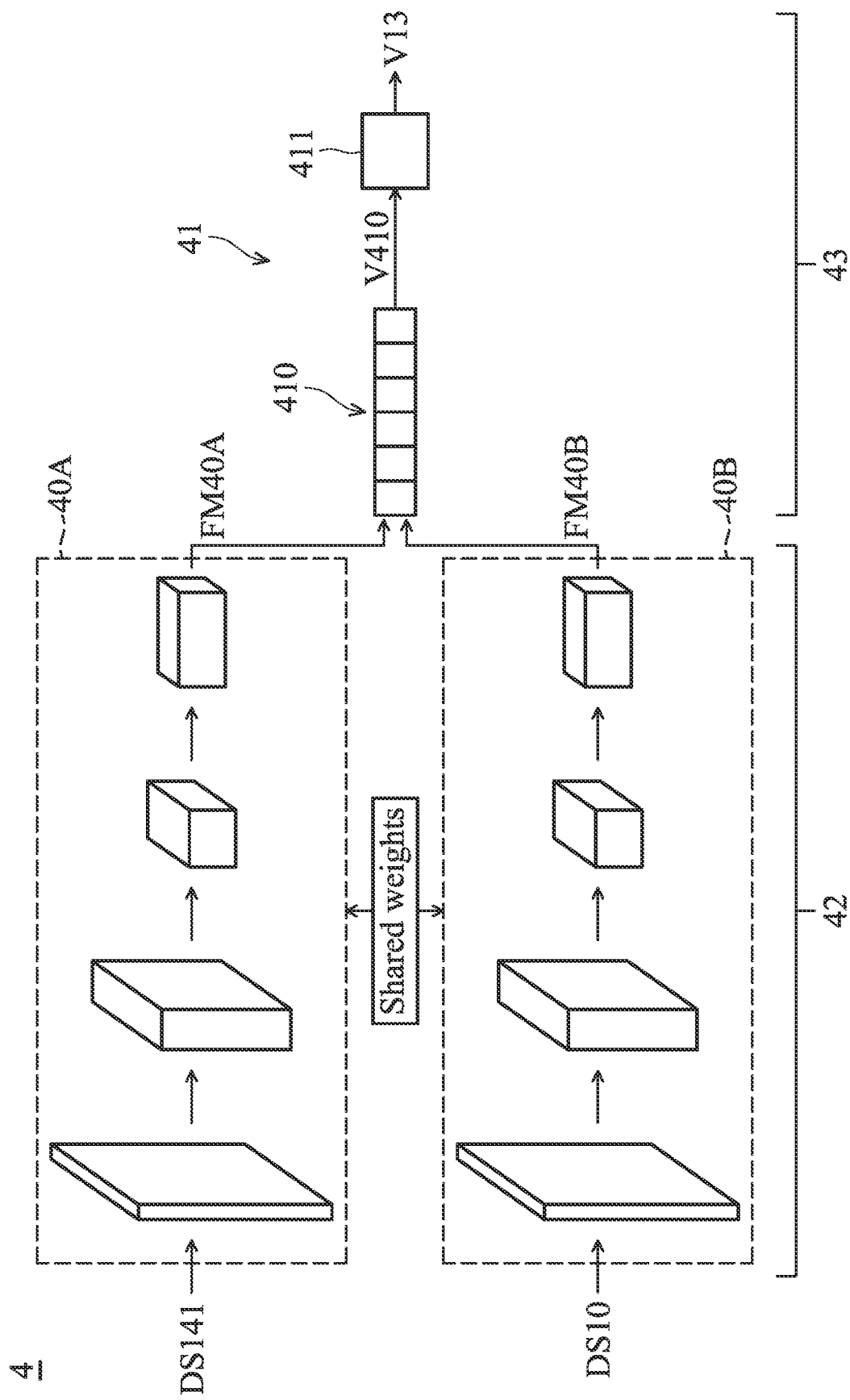
FIG. 4 is a schematic diagram showing an exemplary embodiment of a neural network architecture of an authentication model.

In the embodiment, the authentication model 140 is implemented by a neural network architecture which has two inputs for the sensed PPG signal S10 and the reference PPG signal. FIG. 4 is a schematic diagram showing the neural network architecture of the authentication model 140.

Referring to FIG. 4, a neural network architecture 4 used to implement the authentication model 140 comprises two sub-networks 40A and 40B and a fully connected layer network 41. The architecture of the sub-network 40A is similar to or the same as the architecture of the sub-network 40B, and the two sub-networks 40A and 40B share weights. One data section DS141 of the reference PPG signal S141 is input into the sub-network 40A while one data section (the current data section) DS10 of the sensed PPG signal S10 is input into the sub-network 40B. Each of the sub-networks 40A and 40B comprises a plurality of convolutional stages. In the embodiment, the neural network architecture 4 is explained by taking the sub-networks 40A and 40B having the same architecture as an example.

Figure 5:
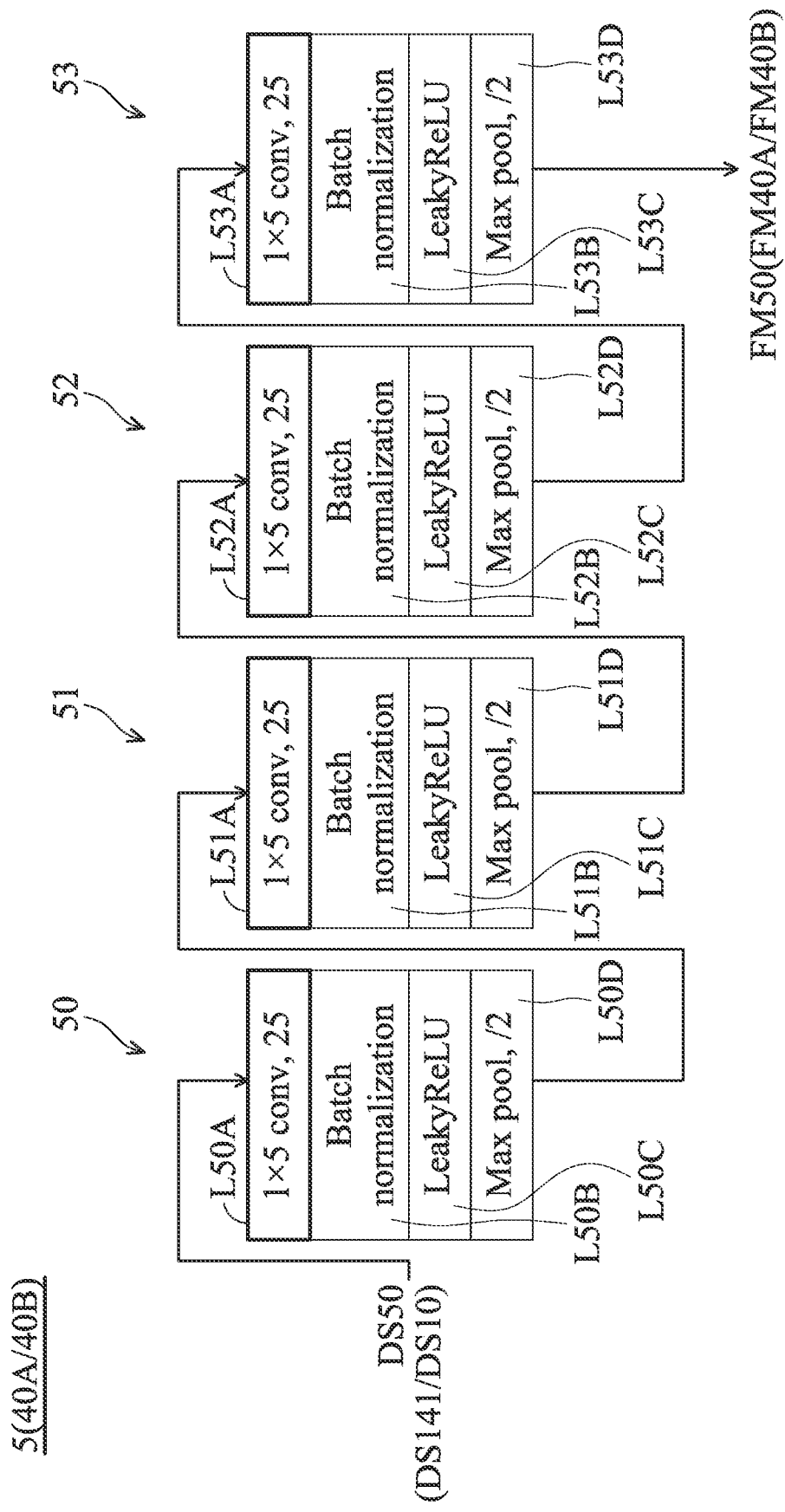
FIG. 5 is a schematic diagram showing the architecture of the sub-network of the authentication model show in FIG. 4.

FIG. 5 is a schematic diagram showing the architecture of the sub-networks 40A and 40B. Referring to FIG. 5, a sub-network 5 is provided and configured to receive a data section DS50. Each of the sub-networks 40A and 40B is implemented by the architecture of the sub-network 5. In cases where the sub-network 5 serves as the sub-network 40A, one data section DS141 of the reference PPG signal S141 is input as the data section DS50. In cases where the sub-network 5 serves as the sub-network 40B, one data section DS10 of the sensed PPG signal S10 is input as the data section DS50. As shown in FIG. 5, in the embodiment, the sub-network 5 comprises, for example, four convolutional stages 50~53.

Referring to FIG. 5, each of the convolutional stages 50~53 comprises a convolutional layer, a batch normalization layer, an activation function layer, and a pooling layer. In the convolutional layer L50A of the convolutional storage 50, a convolution operation (conv) is applied to the data section SD50 by using twenty-five (25) 1×5 filters (kernels) to generate twenty-five feature maps. After the convolution operation, the feature maps from the convolutional layer L50A are normalized in the batch normalization layer L50B, transferred by an activation function in the activation function layer L50C, and then down-sampled in the pooling layer L50D. In the embodiment, the activation function is implemented by LeakyReLU. Moreover, in the embodiment, the down-sampling is implemented by Max pooling, and the rate of the down-sampling is equal to 2.

The feature maps generated by the pooling layer L50D of the convolutional stage 50 are input into the convolutional stage 51. The convolutional stage 51 processes the feature maps through the convolutional layer L51A, the batch normalization layer L51B, the activation function layer L51C, and the pooling layer L51D. In the convolutional layer L51A, a convolution operation (conv) is applied to the feature maps from the convolutional stage 50 by using fifty (50) 1×5 filters to generate fifty feature maps. The other layers L51B~L51D are similar to the layers L50B~L50D described above, thus, the related description is omitted.

The feature maps generated by the pooling layer L51D of the convolutional stage 51 are input into the convolutional stage 52. The convolutional stage 52 processes the feature maps through the convolutional layer L52A, the batch normalization layer L52B, the activation function layer L52C, and the pooling layer L52D. In the convolutional layer L52A, a convolution operation (conv) is applied to the feature maps from the convolutional stage 50 by using one hundred (100) 1×5 filters to generate one hundred feature maps. The other layers L52B~L52D are similar to the layers L50B~L50D described above, thus, the related description is omitted.

The feature maps generated by the pooling layer L52D of the convolutional stage 52 are input into the convolutional stage 53. The convolutional stage 53 processes the feature maps through the convolutional layer L53A, the batch normalization layer L53B, the activation function layer L53C, and the pooling layer L53D. In the convolutional layer L53A, a convolution operation (conv) is applied to the feature maps from the convolutional stage 50 by using two hundred (200) 1×5 filters to generate two hundred feature maps. The other layers L53B~L53D are similar to the layers L50B~L50D described above, thus, the related description is omitted. The feature maps FM50 generated by the pooling layer L53D of the convolutional stage 53 are input into the fully connected layer network 41.

Referring to FIGS. 4~5, based on the architecture of the sub-network 5, the sub-network 40A generates reference feature maps FM40A based on the data section DS141, and the sub-network 40B generates test feature maps FM40B based on the data section (current data section) DS10. The reference feature maps FM40A and the test feature maps FB40B are input into the fully connected layer network 41.

According to the above description, since the sub-networks 40A and 40B have the same architecture and share weights, the sub-networks 40A and 40B perform the same algorithm on the data section DS141 and the data section DS10 to generate reference feature maps FM40A and the test feature maps FM40B, respectively. The algorithm of each of the sub-networks 40A and 40B is implemented by the convolutional layers, the batch normalization layers, the activation function layers, and the pooling layers of the corresponding convolutional stages 50~53.

When the reference feature maps FM40A and the test feature maps FM40B are input into the fully connected layer 410, the fully connected layer network 41 performs another algorithm on values of the reference feature maps FM40A and the values of the test feature maps FM40B to generate the result value V13. Referring to FIG. 4, the fully connected layer network 41 comprises a fully connected layer 410 and a transfer unit 411. The algorithm of the fully connected layer network 41 is implemented by the fully connected layer 410 and the transfer unit 411. The fully connected layer 410 transfers the values reference feature maps FM40A and the values of the test feature maps FM40B by an activation function to generate at least one probability value. In an embodiment, the fully connected layer 410 generates one probability value V410 which indicates the degree of similarity between the data section DS10 of the sensed PPG signal S10 and the data section DS 141 of the reference PPG signal S141.

In the embodiment, the probability value V410 is a value between 0 and 1. The probability value V410 close to 1 indicates the degree of similarity between the data section DS10 and the data section DS 141 is high, while the probability value V410 close to 0 indicates the degree of similarity between the data section DS10 and the data section DS 141 is low.

The probability value V410 is input into the transfer unit 411. The transfer unit 411 performs a transfer function on the probability value V410 to generate the result value V13 of "1" or "0". Based on the transfer function, a threshold is set. When the probability value V410 is greater than the threshold, the result value V13 of "1" is generated, which indicates the sensed PPG signal S10 and the reference PPG signal S141 are in the same category due to the high degree of similarity between the data section DS10 and the data section DS 141. When the probability value V410 is less than the threshold, the result value V13 of "0" is generated, which indicates the sensed PPG signal S10 and the reference PPG signal S141 are not in the same category due to the low degree of similarity between the data section DS10 and the data section DS 141.

In an embodiment, the transfer unit 411 may be implemented by another fully connected layer following the fully connected layer 410.

Referring to FIG. 2, in Step S25, when the low degree of similarity between the data section DS10 and the data section DS 141 is high, the processor 13 determines that the sensed PPG signal and the reference PPG signal S141 are in the same category according to the result value V13 of "1" (S25—Yes); when the low degree of similarity between the data section DS10 and the data section DS 141 is low, the processor 13 determines that the sensed PPG signal and the reference PPG signal S141 are not in the same category according to the result value V13 of "0" (S25—No).

In Step S27A, in response to that the sensed PPG signal and the reference PPG signal S141 are in the same category, the processor 13 determines that the identification of the subject passes the authentication test.

In Step S26, in response to that the sensed PPG signal and the reference PPG signal S141 are not in the same category, the processor 13 determines whether the current data section DS20 of the sensed PPG signal S10 is the last data section of the sensed PPG signal S10. When the current data section is not the last data section of the sensed PPG signal S10 (Step S26—No), the method proceeds to Step S25, and the processor 13 inputs another data section of the sensed PPG signal S10 and the same data section or another data section DS141 of the reference PPG signal S141 into the authentication model 140 to generate the result value V13. The detailed operation of Step S25 has been described above, and, thus, the related description is omitted.

When the current data section is the last data section of the sensed PPG signal S10 (Step S26—Yes), the method proceeds to Step S27B in which the processor 13 determines that the identification of the subject does not pass the authentication test. If the current data section is the last data section of the sensed PPG signal S10, this indicates that all of the data sections of the sensed PPG signal S10 have been used to determine whether the sensed PPG signal S10 and the reference PPG signal S141 are in the same category in Step S25. When the processor 13 still determines that the sensed PPG signal and the reference PPG signal S141 are not in the same category by using the last data section of the sensed PPG signal S10, the processor 13 determines that the identification of the subject does not pass the authentication test.

According to the embodiments of the present application, through the authentication model, the accuracy of determining that the identification of the subject passes the authentication test is about 94.3%, and the accuracy of determining that the identification of the subject does not pass the authentication test is about 97.8%. Thus, the authentication system 1 and the authentication method provided by the embodiments of the present application can authenticate the identification of the subject accurately.

Figure 6A:
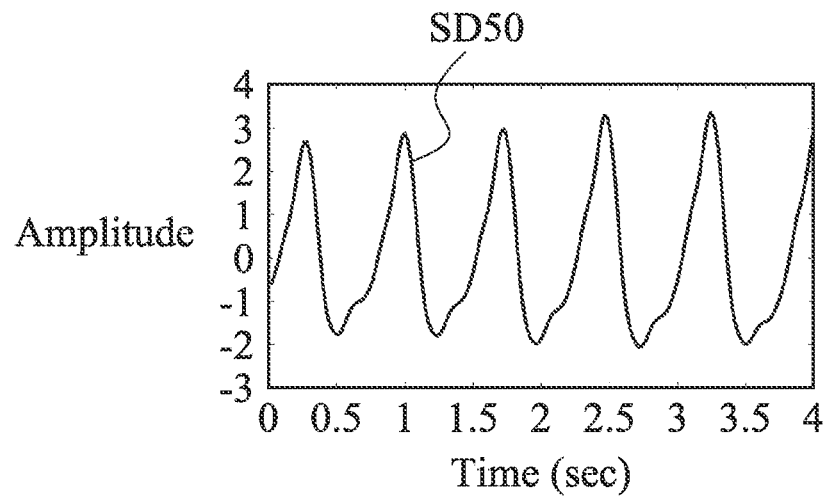
FIGS. 6A~6C are schematic diagrams showing a data section input into the sub-network, outputs of the first convolutional stage in the sub-network, and outputs of the last convolutional stage in the sub-network.
Figure 6B:
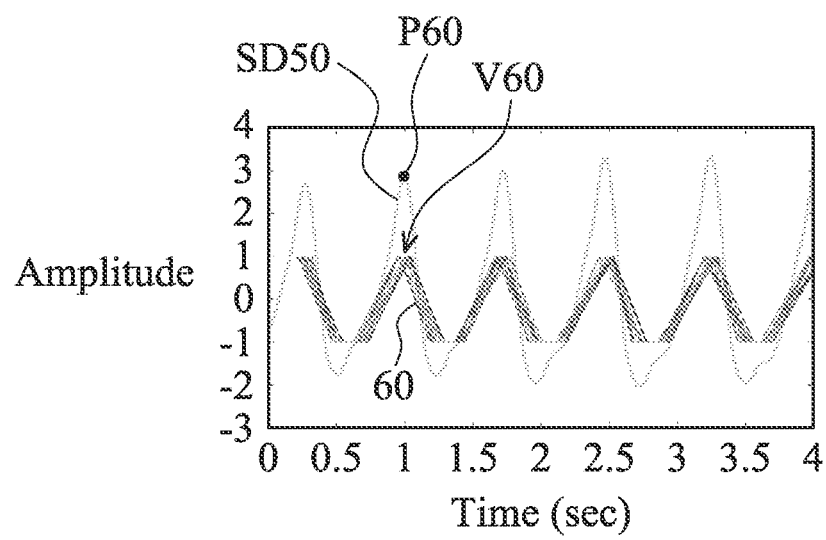
Figure 6C:
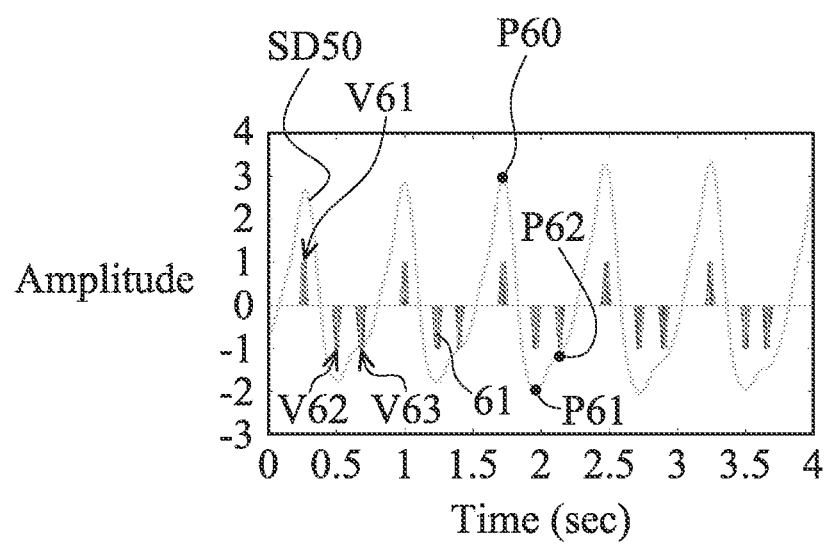

FIGS. 6A~6C are schematic diagrams showing the data section SD50 input into the sub-network 5, the outputs of the first convolutional stage 50, and the outputs of the last convolutional stage 53. The convolutional stage 50 processes the data section SD50 through the layers L50A~L50D to generate the corresponding feature maps. The outputs 60 of the convolutional stage 50 are obtained by processing the values of these feature maps by a function related to dimension reduction and illustrated by two dimensions, as shown in FIG. 6B. Referring to FIG. 6B, the peaks P60 of the waveform of the data section SD50 can be observed according to the outputs 60, such as the peak values V60 of the outputs 60.

The convolutional stage 53 processes the feature maps generated by the pooling layer L52D of the convolutional stage 52 to generate the corresponding feature maps, that is the feature maps FM40A/FM40B. The outputs 61 of the convolutional stage 53 are obtained by processing the values of these feature maps FM40A/FM40B by a function related to dimension reduction and illustrated by two dimensions, as shown in FIG. 6C. Referring to FIG. 6C, the curve turning points P60~P62 of the waveform of the data section SD50 can be observed according to the outputs 61, such as the peak values V61~V63 of the outputs 60A. As shown in FIG. 6C, the curve turning points P61~P63 comprise the peaks P60, the valleys P61, and the gentle points P62 of the waveform, which correspond to the peak values V61, the peak values V62, and the peak values V63 respectively. Thus, according to the peak values V61~V63 of the outputs 60A, the features related to the curve turning points P60~P62 can be observed or exacted. In an embodiment, the features comprise the locations of the curve turning points P61~P63 on the waveform, the amplitude of the waveform at each of the curve turning points P61~P63, the polarity of the waveform at each of the curve turning points P61~P63, and/or the frequency of the curve turning points P61~P63.

In the field of physiological signal detection, the curve turning points of each person's PPG signal are unique. Thus, these curve turning points P60~P62 are meaningful for identifying the unique PPG signal of the subject. Referring to FIG. 6C, for each of the sub-networks 40A and 40B, the features related to the curve turning points P61~P63 can be observed or exacted accurately by the values of the feature maps FM40A/FM40B (the peak values V61~V63 obtained through the dimension reduction). Thus, the sub-networks 40A and 40B serve as a feature exactor 42 as shown in FIG. 4, and the values of the feature maps FM40A/FM40B serve as feature values.

As described above, the fully connected layer network 41 is applied to determine whether the sensed PPG signal and the reference PPG signal S141 are in the same category according to the feature values generated by the sub-networks 40A and 40B. Thus, the fully connected layer network 41 serves as a classifier 43, as shown in FIG. 4.

Figure 7:
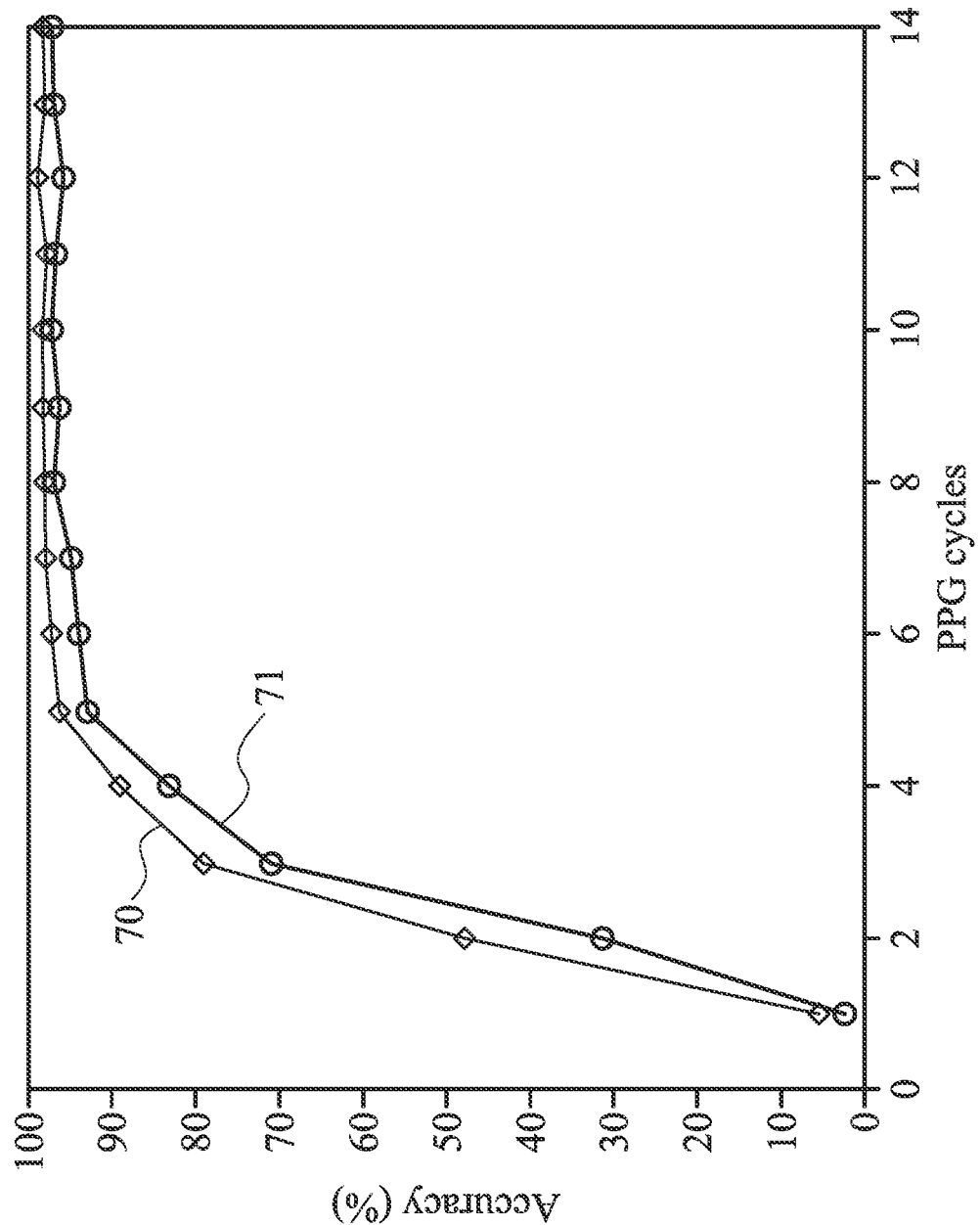
FIG. 7 is a schematic diagram showing accuracy of the neural network architecture of FIG. 4 in different numbers of PPG cycles during a testing process and a training process.

FIG. 7 is a schematic diagram showing accuracy of the neural network architecture 4 in different numbers of PPG cycles during a testing process and a training process. As shown in FIG. 7, a curve 70 represent the accuracy of the neural network architecture 4 for different numbers of PPG cycles during the testing process, and a curve 71 represent the accuracy of the neural network architecture 4 for different numbers of PPG cycles during the training process. For each of the curves 70 and 71, when the number of PPG cycles is four, the accuracy is over 80%; when the number of PPG cycles is five, the accuracy is over 90%. Generally, for a normal physiological state of a subject, at least four cycles occur on the PPG signal within five seconds. Thus, in the embodiment, setting the window size for the segmentation operation of the section extractor 122 as five seconds is sufficient to achieve good accuracy.

In an embodiment, the neural network architecture 4 may comprise a loss layer (not shown). The loss layer specifies how training penalizes the deviation between the probability value V410 output by the fully connected layer 410 and a predetermined true data label (during the training process). The processor 13 may modify the weights of the sub-networks 40A and 40B according to the output of the loss layer. Moreover, the processor 13 may also adjust the window size used by the section extractor 122 according to the output of the loss layer.

In an embodiment, each of the convolutional stages 50~53 of the sub-network 5 may further comprise a dropout layer. The dropout layers are activated during the training process. For each of the convolutional stages 50~53, when the corresponding dropout layer is activated, some weights used in the convolutional stage are not updated. For example, in cases where the parameter of one dropout layer is set 0.55, 55% of the corresponding weights are not updated. In an embodiment, the parameters of the dropout layers of the convolutional stages 50~53 are the same.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An authentication system for authenticating an identification of a subject, comprising:
 a photoplethysmogram (PPG) sensor configured to sense pulses of a blood vessel of the subject to generate a sensed PPG signal of the subject;
 a storage device storing an authentication model, and
 a processor configured to load the authentication model from the storage device and input the sensed PPG signal and a reference PPG signal into the authentication model to generate a result value which indicates whether the identification of the subject passes an authentication test;
 wherein the authentication model is implemented by a neural network architecture.

2. The authentication system as claimed in claim 1, wherein the neural network architecture comprises two sub-networks respectively receiving the sensed PPG signal and the reference PPG signal.

3. The authentication system as claimed in claim 2, wherein the neural network architecture comprises:
 a first sub-network receiving the sensed PPG signal and performing a first algorithm on the sensed PPG signal to generate a plurality of first feature maps;
 a second sub-network receiving the reference PPG signal and performing the first algorithm on the reference PPG signal to generate a plurality of second feature maps; and
 a fully connected layer network receiving the plurality of first feature maps and the plurality of second feature maps, wherein the fully connected layer network performs a second algorithm on the plurality of first feature maps and the plurality of second feature maps to generate the result value.

4. The authentication system as claimed in claim 3, wherein each of the first sub-network and the second sub-network comprises a plurality of convolutional stages.

5. The authentication system as claimed in claim 4, wherein for each of the first sub-network and the second sub-network, each convolutional stage comprises a convolutional layer, a batch normalization layer, an activation function layer, and a pooling layer.

6. The authentication system as claimed in claim 2, wherein the neural network architecture comprises:
 a feature exactor coupled to receive the sensed PPG signal and the reference PPG signal, extract a plurality of specific features of the sensed PPG signal to generate a plurality of first feature values, and extract the plurality of specific features of the reference signal to generate a plurality of second feature values; and
 a classifier configured to receive the plurality of first feature values and the plurality of second feature values and determine a degree of similarity between the plurality of specific features of the sensed PPG signal and the plurality of specific features of the reference PGG signal according to the plurality of first feature values and the plurality of second feature values to generate the result value.

7. The authentication system as claimed in claim 6, wherein:
 in response to the classifier determining that the degree of similarity between the plurality of specific features of the sensed PPG signal and the plurality of specific features of the reference PGG signal is high, the classifier determines that the sensed PPG signal and the reference PPG signal are in the same category to generate the result value, and the processor determines that the identification of the subject passes the authentication test according to the result value; and in response to the classifier determining that the degree of similarity between the plurality of specific features of the sensed PPG signal and the plurality of specific features of the reference PGG signal is low, the classifier determines that the sensed PPG signal and the reference PPG signal are in different categories to generate the result value, and the processor determines the identification of the subject does not pass the authentication test according to the result value.

8. The authentication system as claimed in claim 6, wherein:

each of the sensed PPG signal and the reference PPG signal has a waveform, for each of the sensed PPG signal and the reference PPG signal, the plurality of specific features are related to curve turning points of the waveform.

9. The authentication system as claimed in claim 8, wherein for each of the sensed PPG signal and the reference PPG signal, the plurality of specific features comprise locations of the curve turning points on the waveform, an amplitude of the waveform at each curve turning point, a polarity of the waveform at each curve turning point, and/or a frequency of the curve turning points.

10. The authentication system as claimed in claim 1, further comprising:

a pre-processor configured to receive the sensed PPG signal and process the sensed PPG signal by filtering out noise and a component in a specific frequency range from the sensed PPG signal and further removing at least one signal section, which corresponds to motion artifact of the subject, from the sensed PPG signal, wherein the pre-processor outputs the sensed PPG signal which has been processed to the processor.

11. The authentication system as claimed in claim 10, further comprising:

a motion detector, coupled to the pre-processor, configured to detect movement of the subject, wherein when the motion sensor senses that the subject moves violently, the pre-processor removes at least one signal section, which corresponds to a violent movement of the subject, from the sensed PPG signal.

12. The authentication system as claimed in claim 1, further comprising:

a pre-processor configured to receive the sensed PPG signal and the reference PPG signal and segment the sensed PPG signal into a plurality of first sections by window size, wherein the processor receives one of a plurality of second sections of the reference PPG signal, and wherein the pre-processor is further configured to provide one of the plurality of first sections, and the processor inputs the one first section and the one second section into the authentication model to generate the result value.

13. The authentication system as claimed in claim 12, wherein the plurality of second sections of the reference signal are stored in the storage device.

14. An authentication method for authenticating an identification of a subject, comprising:

sensing pulses of a blood vessel of the subject to generate a sensed PPG signal of the subject;

determining whether the sensed PPG signal and a reference PPG signal are in the same category by using an authentication model to generate a result value; and determining whether the identification of the subject passes an authentication test according to the result value;

wherein the authentication model is implemented by a neural network architecture.

15. The authentication method as claimed in claim 14, wherein determining whether the sensed PPG signal and the reference PPG signal are in the same category comprises:

extracting a plurality of specific features of the sensed PPG signal to generate a plurality of first feature values;

extracting the plurality of specific features of the reference signal to generate a plurality of second feature values;

determining a degree of similarity between the plurality of specific features of the sensed PPG signal and the plurality of specific features of the reference PGG signal according to the plurality of first feature values and the plurality of second feature values;

determining whether the sensed PPG signal and the reference PPG signal are in the same category to generate the result value according to the determined degree of similarity.

16. The authentication method as claimed in claim 15, wherein determining whether the sensed PPG signal and the reference PPG signal are in the same category further comprises:

in response to the degree of similarity being high, determining that the sensed PPG signal and the reference PPG signal are in the same category and generate a first value as the result value; and in response to the degree of similarity being low, determining that the sensed PPG signal and the reference PPG signal are not in the same category to generate the result value and generate a second value as the result value.

17. The authentication method as claimed in claim 16, wherein determining whether the identification of the subject passes the authentication test according to the result value comprises:

in response to determining that the sensed PPG signal and the reference PPG signal are in the same category, determining the identification of the subject passes the authentication test according to the first value; and in response to determining that the sensed PPG signal and the reference PPG signal are not in the same category, determining the identification of the subject does not pass the authentication test according to the second value.

18. The authentication method as claimed in claim 15, wherein:

each of the sensed PPG signal and the reference PPG signal has a waveform, for each of the sensed PPG signal and the reference PPG signal, the plurality of specific features are related to curve turning points of the waveform.

19. The authentication method as claimed in claim 18, wherein for each of the sensed PPG signal and the reference PPG signal, the plurality of specific features comprises locations of the curve turning points on the waveform, an amplitude of the waveform at each curve turning point, a polarity of the waveform at each curve turning point, and/or a frequency of the curve turning points.

20. The authentication method as claimed in claim 18, further comprising:
    processing the sensed PPG signal by performing a filter operation and a motion artifact removing operation on the sensed PPG signal;
    wherein a determination is made as to whether the sensed PPG signal that has been processed is in the same category as the reference PPG signal.

21. The authentication method as claimed in claim 14, wherein the neural network architecture comprises two sub-networks respectively receiving the sensed PPG signal and the reference PPG signal.

* * * * *